R. McK. NELSON.
PRESSURE GAGE.
APPLICATION FILED SEPT. 20, 1920.

1,391,138.

Patented Sept. 20, 1921.

INVENTOR
Ralph McK. Nelson
BY
Kerr, Page, Cooper & Hayward
ATTORNEYS

UNITED STATES PATENT OFFICE.

RALPH McKINLEY NELSON, OF SELLERSVILLE, PENNSYLVANIA, ASSIGNOR TO UNITED STATES GAUGE COMPANY, OF NEW YORK, N. Y., A CORPORATION OF PENNSYLVANIA.

PRESSURE-GAGE.

1,391,138.

Specification of Letters Patent.   Patented Sept. 20, 1921.

Application filed September 20, 1920. Serial No. 411,429.

*To all whom it may concern:*

Be it known that I, RALPH McK. NELSON, a citizen of the United States, residing at Sellersville, in the county of Bucks and State of Pennsylvania, have invented certain new and useful Improvements in Pressure-Gages, of which the following is a full, clear, and exact description.

The invention which forms the subject of this application for Letters Patent is an improvement in pressure gages, the nature and purpose of which will be readily understood from the following considerations.

Certain regulations, State or municipal, require that all boilers of a certain type be equipped with pressure gages, and furthermore that such gages must be constructed and adapted to indicate any pressure up to a prescribed maximum. The boiler may be one for domestic heating and not designed and never intended to generate more than a few pounds of steam, say ten at most. Nevertheless, it is required that the gage shall be capable of indicating much higher pressure, say thirty pounds, and this is an onerous requirement as it necessitates the construction and use of a high grade instrument, the cost of which is quite out of proportion to that of the boiler.

Manufacturers of such boilers have therefore been required to resort to various expedients to meet this regulation and for such purpose have usually devised and made duplex gages, comprising in a single instrument two dials and two pointers, each of the latter being operated by its own Bourdon tube or equivalent device, one of which is adapted for indicating low pressure and the other pressure over a much greater range. These instruments while useful and desirable are still objectionable on the score of cost, and I have therefore sought to produce a simpler and cheaper device which will accomplish the desired result.

According to my present improvement I combine in the same instrument two dials or scales and two pointers. One of these latter, or that intended for indicating the lower pressures is operated by a Bourdon tube of the usual character which is rigidly mounted on a fixed standard in the casing at a point intermediate its two ends. The point of support, however, is much nearer one end than the other and the longer end is connected with the usual means for rotating the pointer to an amount proportional to the distortion of the tube under internal pressure.

The other or shorter end of the tube is similarly connected with means of the same character for imparting movement to a smaller pointer moving over a smaller scale and capable of registering much higher pressures than the other. The invention involves, therefore, the combination with one and the same tube of two pointers and intermediate mechanism for moving the pointers properly constructed as to the character of the gears and other parts used to enable one to register low pressures and the other pressures of a much more extended range.

This improvement is shown in the accompanying drawing, in which—

Figure 2:
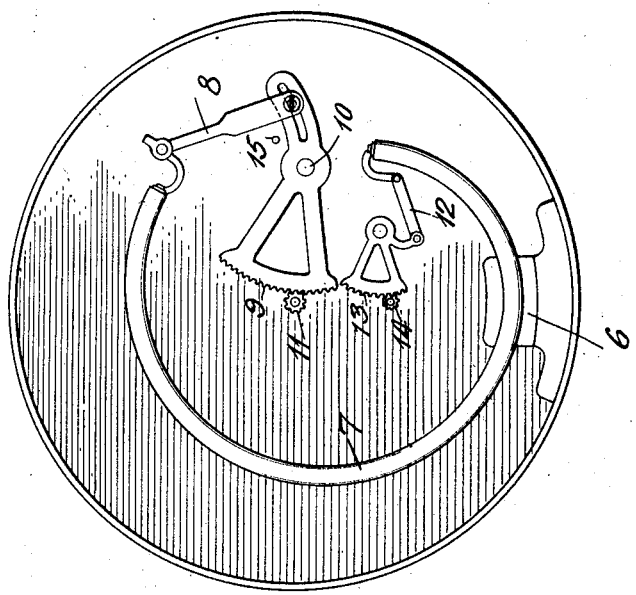
Fig. 2 is a view in elevation of the interior mechanisms for moving the pointers.
Figure 1:
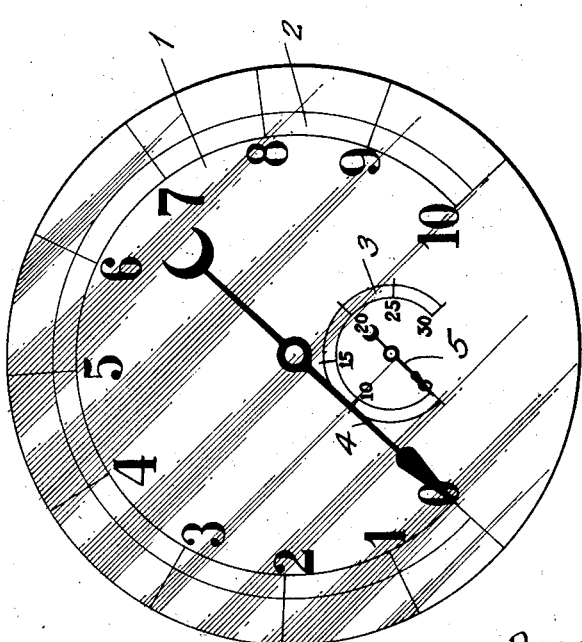
Figure 1 is a face view of the outside of the gage casing.

The instrument is of the usual pattern and has a dial plate 1, on which are marked two scales, the outer and larger scale 2 having, say ten divisions, the inner and smaller scale 3 having, say thirty divisions. Each scale has a pointer 4 or 5.

In the interior of the casing is a fixed stud or standard 6, and to this is rigidly secured an ordinary gage tube or spring 7, the point of union being at about a third or less of the length of the entire tube. The longer free end is connected by a link 8 to a segmental rack 9 pivoted at 10 and engaging with a pinion 11 on the shaft of the pointer 4. The shorter end is similarly connected by a link 12 with a segmental rack 13 which engages with a pinion 14 on the shaft of pointer 5.

Manifestly, since the movement for a given pressure of the longer end is much greater than that of the shorter end, the sizes of the racks and the nature of the intermediate gearing will be correspondingly different—that is to say, the racks are of different radius and adapted to produce the proper movements of the pointers for a given movement of the tube, the pinions meshing with said racks being of different diameters. When the longer arm has indicated ten pounds pressure the rack bar encounters a fixed stop 15 and the pointer can move no farther. The other pointer, however, will indicate by the same relative movement in all thirty pounds, which ordinarily is beyond the capacity of the boiler.

This is an extremely simple instrument which may be produced at a greatly reduced cost, but which meets all the requirements of the more expensive and complicated devices heretofore designed and built for the same purpose.

What I claim is:

1. In a pressure gage, the combination with the same dial having two scales thereon and pointers for said scales, of a pressure tube rigidly mounted at a point intermediate its ends and nearer one end than the other, of means operated by the two free ends for turning the respective pointers proportionally to the movements of said ends.

2. In a pressure gage, the combination with the same dial or plate having a low pressure scale and a higher pressure scale thereon and two pointers movable over the same, of a pressure tube rigidly mounted on a fixed support at a point nearer one end than the other, and racks for imparting rotary movement to the two pointers one connected with and operated by the distortion of the longer free end of said tube and the other by the shorter end of the same.

3. In a pressure gage, the combination with the same dial or plate having a low pressure scale and a higher pressure scale thereon, and two pointers movable over the same, of a pressure tube rigidly mounted on a fixed support at a point nearer one end than the other, racks of different dimensions and pinions of different diameters connected respectively with the longer and the shorter ends of the said tube and geared with the shafts which carry the two pointers.

In testimony whereof I hereto affix my signature.

RALPH McKINLEY NELSON.